(12) United States Patent
Cerreto

(10) Patent No.: US 8,646,795 B2
(45) Date of Patent: Feb. 11, 2014

(54) RECLINING SEAT

(75) Inventor: Matthew Cerreto, Sullivan, OH (US)

(73) Assignee: Invacare Corporation, Elyria, OH (US)

( * ) Notice: Subject to any disclaimer, the term of this patent is extended or adjusted under 35 U.S.C. 154(b) by 428 days.

(21) Appl. No.: 12/943,523

(22) Filed: Nov. 10, 2010

(65) Prior Publication Data
US 2012/0112507 A1 May 10, 2012

(51) Int. Cl.
B62M 1/14 (2006.01)
B60N 2/00 (2006.01)
B60N 2/02 (2006.01)

(52) U.S. Cl.
USPC ............. 280/250.1; 297/DIG. 4; 297/354.12; 297/327

(58) Field of Classification Search
USPC ....... 297/DIG. 4, 322, 342, 343, 354.12, 327, 297/316; 280/250.1
See application file for complete search history.

(56) References Cited

U.S. PATENT DOCUMENTS

| | | | |
|---|---|---|---|
| 4,411,469 A * | 10/1983 | Drabert et al. | 297/300.2 |
| 4,572,573 A * | 2/1986 | Yoshikawa et al. | 297/75 |
| 4,655,471 A | 4/1987 | Peek | |
| 5,261,725 A * | 11/1993 | Rudolph | 297/361.1 |
| 5,297,021 A | 3/1994 | Koerlin et al. | |
| 5,556,157 A * | 9/1996 | Wempe | 297/68 |
| 5,634,688 A * | 6/1997 | Ellis | 297/358 |
| 6,126,186 A * | 10/2000 | Mascari | 280/220 |
| 6,158,810 A | 12/2000 | Galloway | |
| 6,276,704 B1 | 8/2001 | Suiter | |
| 6,390,554 B1 | 5/2002 | Eakins et al. | |
| 7,007,965 B2 * | 3/2006 | Bernatsky et al. | 280/304.1 |
| 7,040,701 B2 | 5/2006 | Tada | |
| 7,055,634 B2 | 6/2006 | Molnar | |
| 7,296,856 B2 | 11/2007 | Rozaieski et al. | |
| 7,490,904 B2 | 2/2009 | Hogg | |
| 2009/0186747 A1 | 7/2009 | Lokken et al. | |

OTHER PUBLICATIONS

International Search Report and Written Opinion from PCT/US11/59282 dated Mar. 16, 2012.
One page brochure, LaBac Systems, LaBac Manual Recline Chair (MRCtm), date unknown.

* cited by examiner

Primary Examiner — Milton Nelson, Jr.
(74) Attorney, Agent, or Firm — Calfee, Halter & Griswold LLP

(57) ABSTRACT

A seat for a wheelchair is provided. An exemplary embodiment of the seat includes a seat back portion, a bottom portion, and a linkage coupling the bottom portion to the seat back portion such that the seat back portion is movable relative to the bottom portion. The linkage generally includes a first link and a second link. The first link is generally pivotally connected to the bottom portion and the seat back portion. The second link is generally pivotally connected to the bottom portion and the seat back portion. The first link and the second link pivot relative to the seat back portion and the bottom portion as the seat back portion is moved relative to the bottom portion.

23 Claims, 19 Drawing Sheets

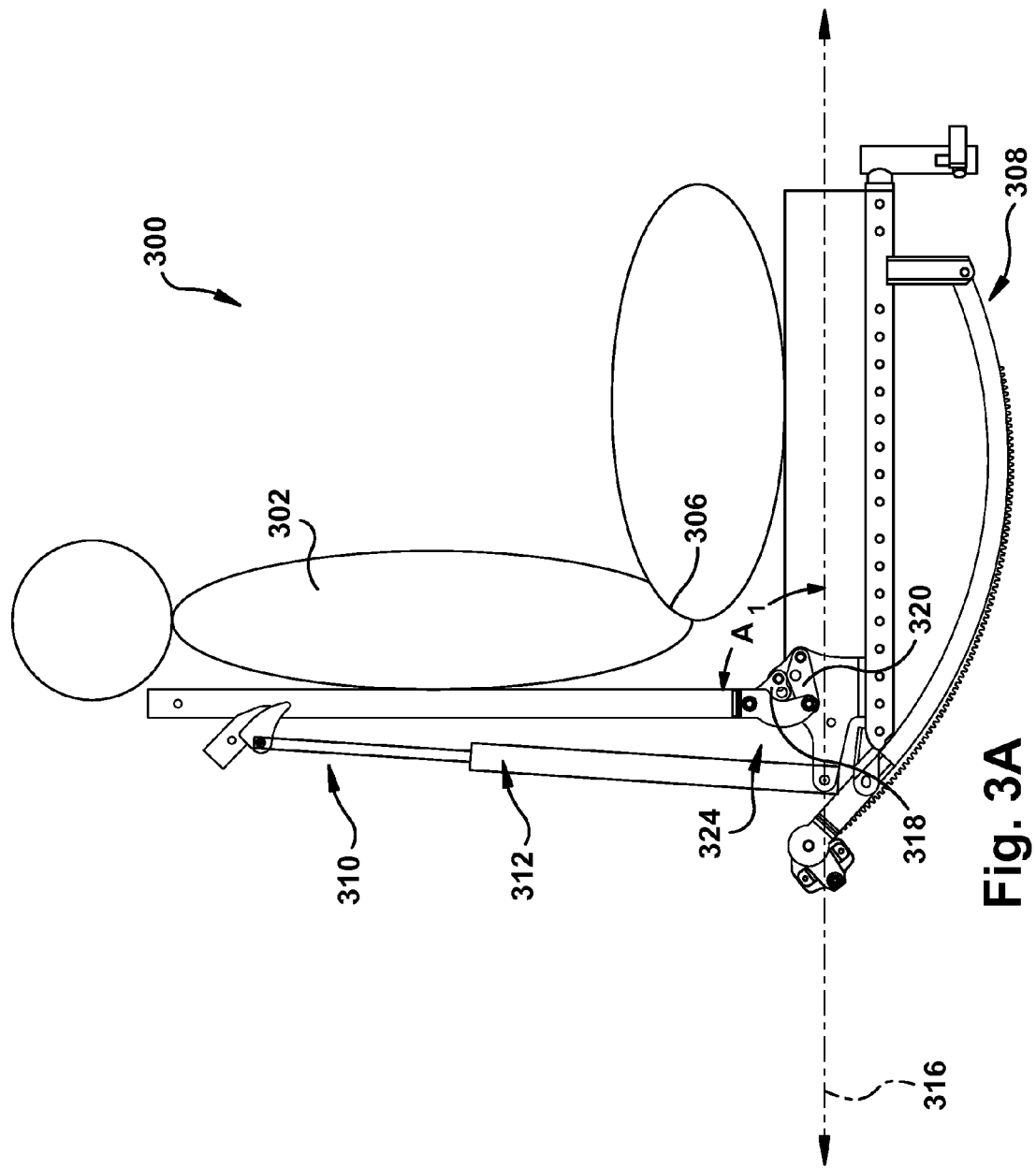

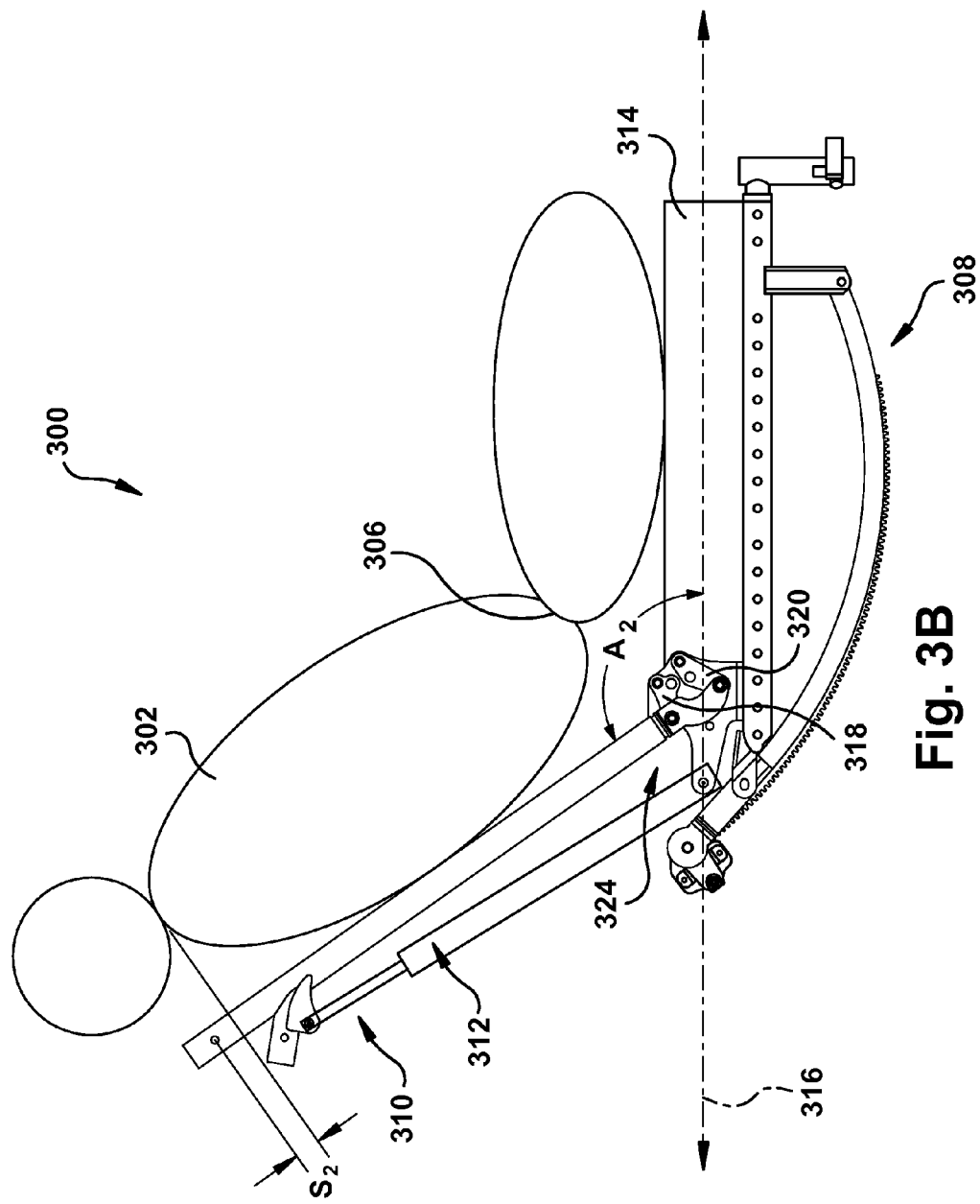

RECLINING SEAT

FIELD OF THE INVENTION

The invention of the present application relates to a reclining seat. More specifically, one exemplary embodiment of the invention described in the present application relates to a reclining seat for a wheelchair.

BACKGROUND

Reclining seats generally have a back portion that pivots relative to a bottom portion of the seat. The back portion of a conventional reclining seat moves relative to the user's back as the back portion is pivoted relative to the bottom portion. This movement rubs the user's back as the seat is reclined. This rubbing is generally known as back shear. Further, because the back portion moves relative to the user's back, seating devices that may be attached to the back portion (e.g., headrests, lateral supports) shift position relative to the user.

SUMMARY

A seat is provided that permits the seat back to move relative to the seat bottom. An exemplary embodiment of one such seat includes a seat back portion, a bottom portion, and a linkage movably coupling the seat back portion to the bottom portion. The linkage includes a first link pivotally connected to the seat back portion and the bottom portion and a second link pivotally connected to the seat back portion and the bottom portion. The first link and the second link pivot relative to the seat back portion and the bottom portion as the seat back portion is moved relative to the bottom portion.

A wheelchair is also provided for positioning and transporting patients. An exemplary embodiment of one such wheelchair includes a wheelchair frame, a plurality of wheels supporting the wheelchair frame, and a seat assembly supported by the wheelchair frame. The seat assembly includes a seat back portion, a bottom portion, and a linkage coupling the seat back portion to the bottom portion such that movement of the linkage from an upright position to a reclined position causes a lower end portion of the seat back portion to move downward and forward relative to the bottom portion.

Methods of reclining a wheelchair seat are also disclosed by the present application. An exemplary method includes positioning a wheelchair seat back portion in an upright position relative to a wheelchair seat bottom portion and moving the wheelchair seat back portion from the upright position relative to the wheelchair seat bottom portion to a reclined position. In the reclined position, the wheelchair seat back portion is angled relative to the wheelchair seat bottom portion. The movement of the wheelchair seat back portion from the upright position to the reclined position causes a lower end portion of the wheelchair seat back portion to move downward and forward relative to the wheelchair seat bottom portion.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIGS. 3A-3C are right side elevational views of one embodiment of a seat of the present invention.

DESCRIPTION OF EMBODIMENTS

Figure 1A:
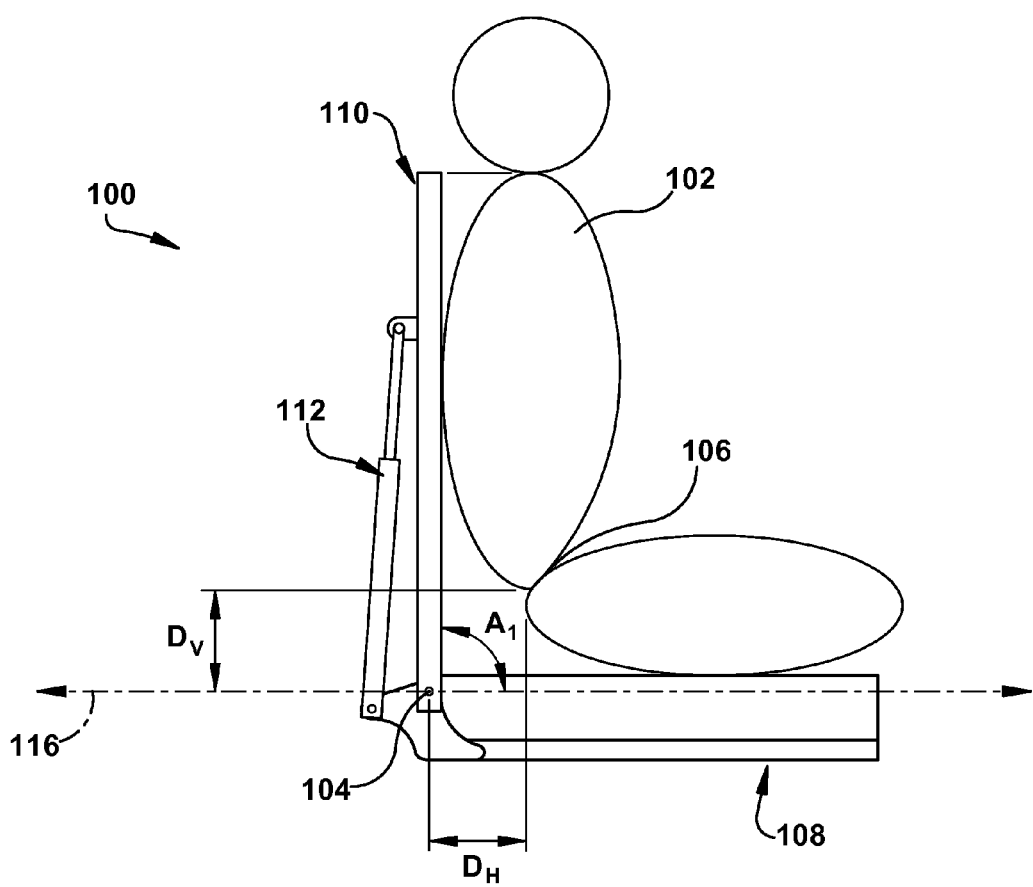
FIGS. 1A-1C are right side elevational views of a conventional reclining seating system.

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements.

A reclining seat is disclosed in the present application. In many exemplary embodiments disclosed herein, the reclining seat is utilized on a wheelchair having a tiltable seat assembly. However, the reclining seat may be utilized on any conventional or typical wheelchair such as a powered wheelchair or manual wheelchair. The reclining seat may also be utilized in a variety of other devices and apparatuses.

The applicant has discovered that configuring a reclining seat such that the path of travel of the seat back relative to the seat bottom approximates the natural pivot of a person's back will reduce, or eliminate, any "back shear" experienced by a user when reclining the seat back. "Back shear" as used in this application is the distance the seat back slides relative to the back of a user as the seat back is reclined relative to the seat bottom. In general, the natural pivot point of a seated person's back is at the person's hip joint. However, merely aligning the simple pivot point between the seat back and the seat bottom with a user's hip joint may not be possible or commercially feasible in some applications. For example, in regards to wheelchairs, alignment of this simple pivot point with a user's hip joint may affect the structure, geometry, and/or adjustability of the wheelchair.

The seat of the present application generally includes a seat back portion, a bottom portion, and a linkage coupling the bottom portion to the seat back portion such that the seat back portion is movable relative to the bottom portion. The linkage is configured such that the movement of the linkage from an upright position to a reclined position causes a lower end portion of the seat back portion to move downward and forward relative to the bottom portion. As the linkage is moved from the upright position to the reclined position, the path of travel of the seat back portion relative to the bottom portion approximates the natural pivot of the back of a user seated within the seat.

The seat of the present application reduces the amount of shear between the seat back portion and the back of the user (i.e., back shear) when compared to a seating system having a seat back pivotally connected to a seat bottom at a simple pivot point that is not substantially aligned with the hip joint of a user seated within the seating system. As the linkage is moved from the upright position to the reclined position, the amount of shear between the seat back portion and the back of a user seated within the seat is less than the amount of shear between a seat back and the back of a user seated within a seating system in which the seat back is reclined relative to a seat bottom pivotally connected to the seat back at a simple pivot point that is at least about 3 to 7 inches, about 4 to 6 inches, about 5 to 6 inches, about 5 inches, or about 5.5 inches rearward from the hip joint of an average adult user seated within the seat.

Figure 1B:
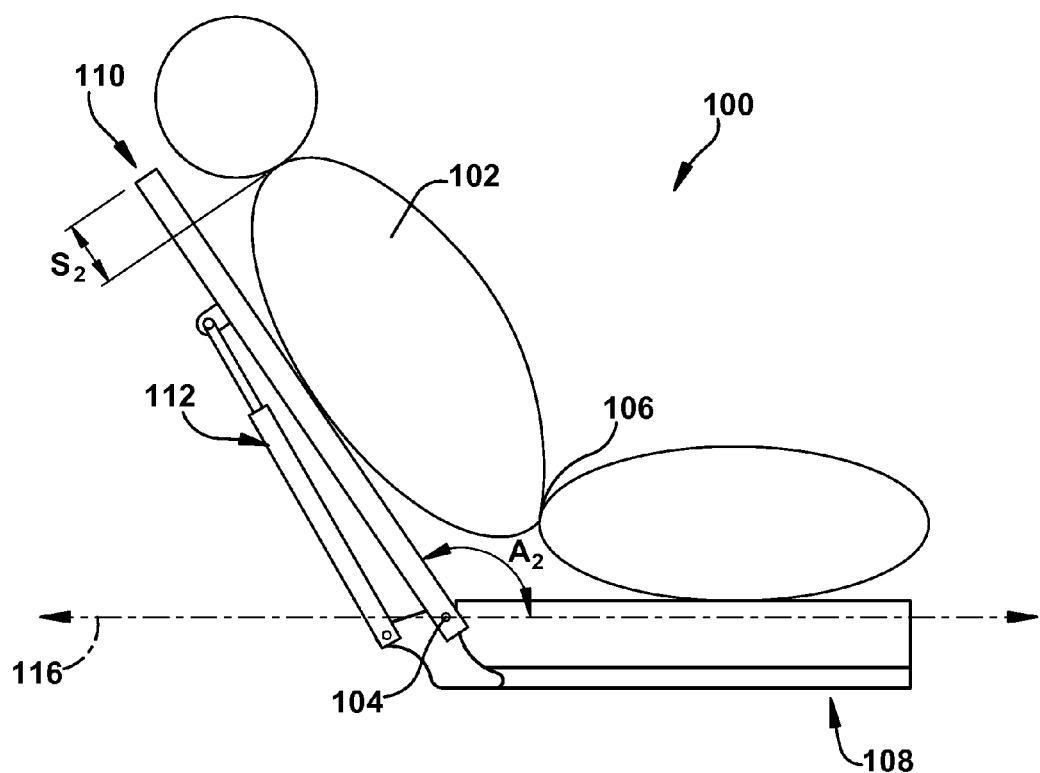
Figure 1C:
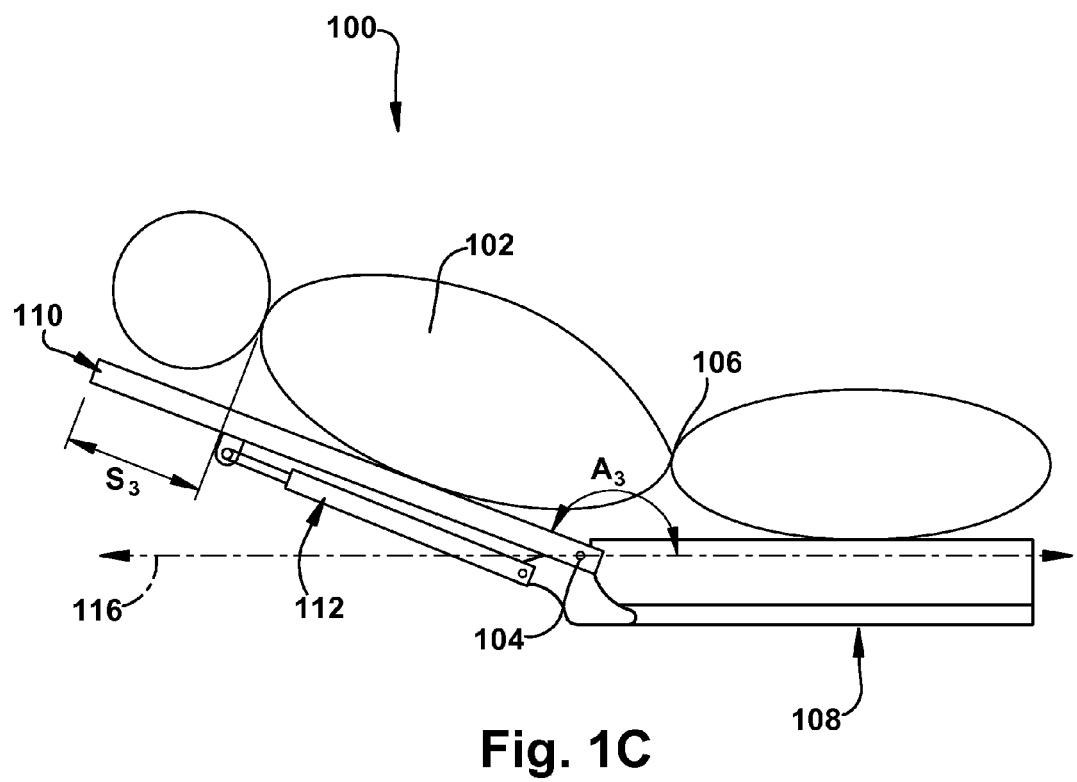

A conventional reclining seating system 100 for a wheelchair is illustrated in FIGS. 1A-1C. Seating system 100 includes a seat back 110 and a seat bottom 108. Seat back 110 is pivotally connected to seat bottom 108 at a simple pivot point 104. As shown, simple pivot point 104 is not substantially aligned with the hip joint 106 of user 102 seated within seating system 100. Instead, simple pivot point 104 is located rearward and downward from the hip joint 106 of user 102. As shown, simple pivot point 104 is positioned about 3.5 to 4.5 inches downward in the vertical direction $D_V$ and about 5.5 inches rearward in the horizontal direction $D_H$ from the hip joint 106 of an average adult user 102. Locking mechanism 112 is coupled to seat back 110 and seat bottom 108 to selectively lock the position of the seat back relative to the seat bottom, such as at the positions illustrated by FIGS. 1A-1C.

FIG. 1A illustrates seating system 100 in a substantially upright position in which an angle $A_1$ between seat back 110 and a horizontal axis 116 is about 90 degrees (i.e., the seat back is substantially perpendicular to the horizontal axis or about 0 degrees of recline). FIG. 1B illustrates seating system 100 in a partially reclined position in which an angle $A_2$ between seat back 110 and horizontal axis 116 is about 120 to 130 degrees, or about 125 degrees (i.e., about 35 degrees of recline). In this position, the amount of back shear $S_2$ between seat back 110 and the back of user 102 is about 2.8 to 3.2 inches, about 3.0 inches, or about 3 inches. FIG. 1C illustrates seating system 100 in a reclined position in which angle $A_3$ between seat back 110 and horizontal axis 116 is about 155 to 165 degrees, or about 160 degrees (i.e., about 70 degrees of recline). In this position, the amount of back shear $S_3$ between seat back 110 and the back of user 102 is about 6.0 to 6.5 inches, about 6.3 inches, or about 6 inches.

Figure 2A:
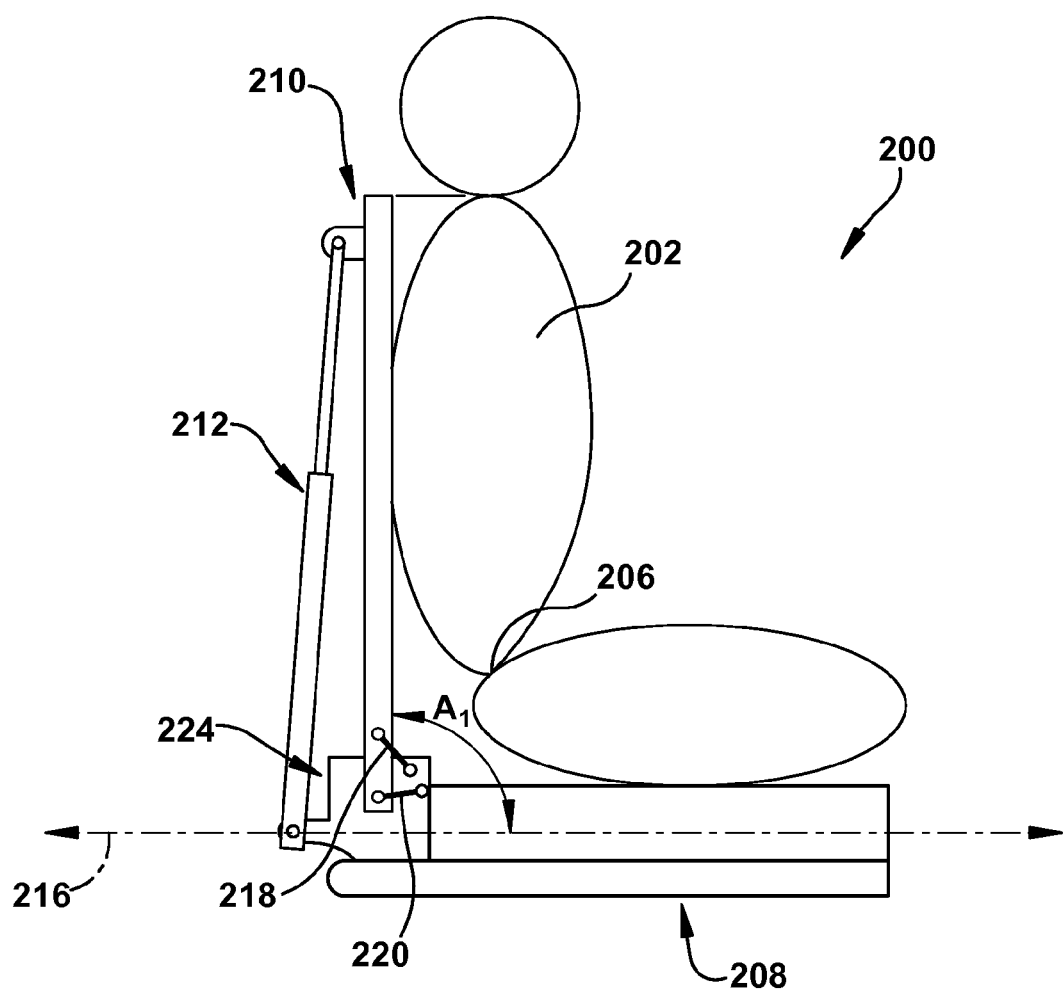
FIGS. 2A-2C are right side elevational views of one embodiment of a seat of the present invention.
Figure 2B:
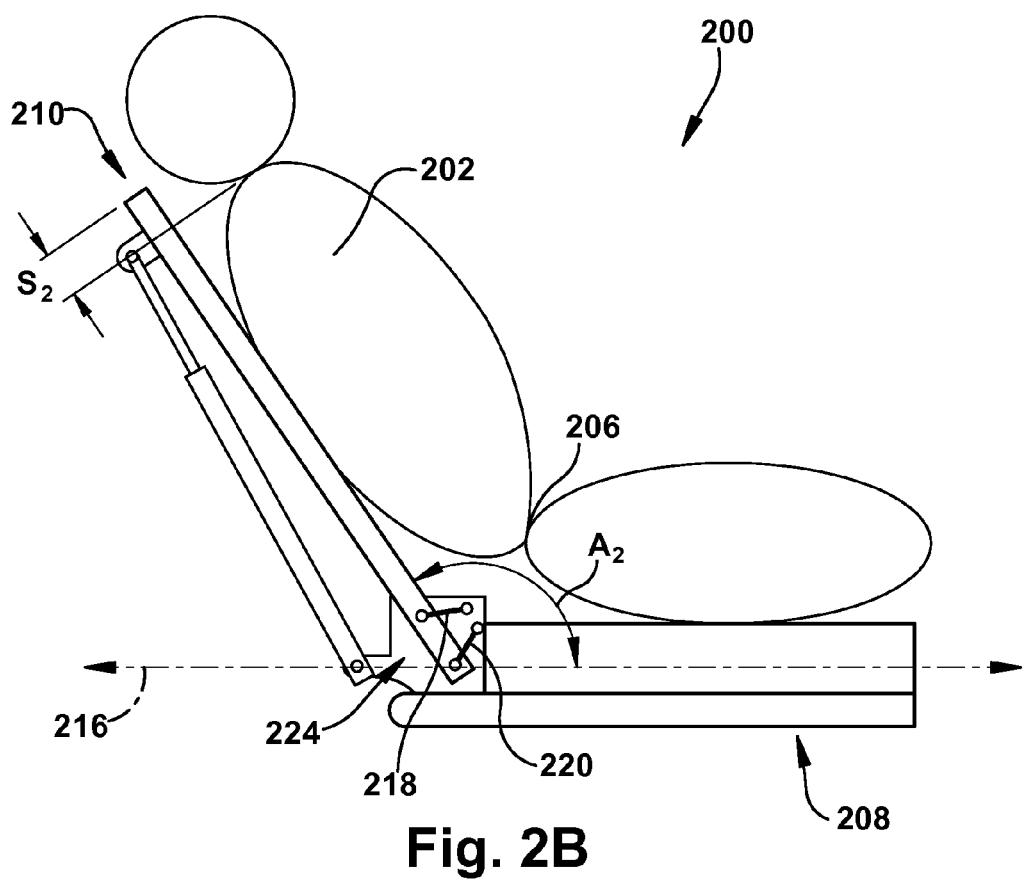
Figure 2C:
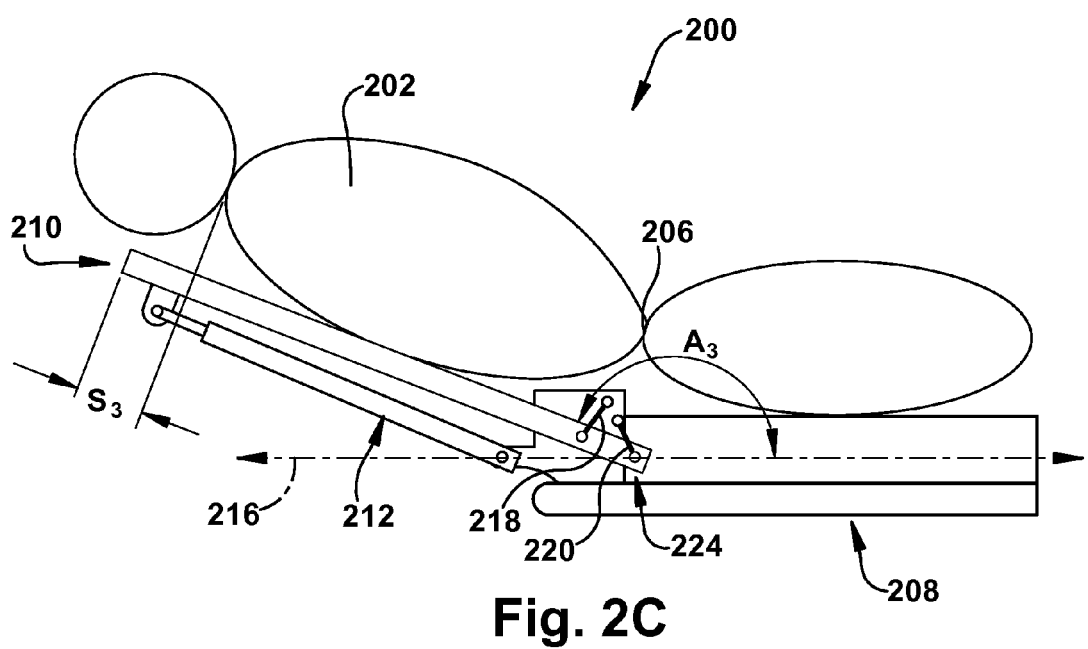

FIGS. 2A-2C illustrate a seat 200 for a wheelchair according to one embodiment of the present application. Seat 200 includes a seat back portion 210, a bottom portion 208, and a linkage 224 coupling the seat back portion to the bottom portion such that the seat back portion is movable relative to the bottom portion. Seat 200 further includes a locking mechanism 212 coupled to seat back portion 210 and bottom portion 208 to control the movement of the seat back portion relative to the bottom portion. As shown, locking mechanism 212 is a locking gas cylinder. However, other locking mechanism capable of controlling the movement of the seat back portion relative to the bottom portion may be used, such as a locking telescoping rod having a biased return mechanism, a powered system (electric or hydraulic), or the like. In some embodiments, a seat back cushion may be fixed relative to seat back portion 210.

Linkage 224 is configured such that the movement of the linkage from an upright position (FIG. 2A) to a reclined position (FIG. 2C) causes a lower end portion of seat back portion 210 to move downward and forward relative to bottom portion 208. As shown, linkage 224 includes a first link 218 pivotally connected to seat back portion 210 and bottom portion 208 and a second link 220 pivotally connected to seat back portion 210 and bottom portion 208. First link 218 and second link 220 pivot relative to seat back portion 210 and bottom portion 208 as the seat back portion is moved relative to the bottom portion.

Further, linkage 224 is configured such that first link 218 and second link 220 pivot in the same direction relative to seat back portion 210 and bottom portion 208 as the seat back portion is moved relative to the bottom portion. As illustrated in FIGS. 2A-2C, first link 218 and second link 220 both rotate in a counterclockwise direction relative to seat back portion 210 and bottom portion 208 as linkage 224 moves from the upright position to the reclined position. In other embodiments, linkage 224 may include a combination of more or less links coupling the seat back portion to the bottom portion.

FIG. 2A illustrates seat 200 in a substantially upright position in which an angle $A_1$ between seat back portion 210 and a horizontal axis 216 is about 90 degrees (i.e., the seat back portion is substantially perpendicular to the horizontal axis or about 0 degrees of recline). FIG. 2B illustrates seat 200 in a partially reclined position in which an angle $A_2$ between seat back portion 210 and horizontal axis 216 is about 120 to 130 degrees, or about 125 degrees (i.e., about 35 degrees of recline). In this position, the amount of back shear $S_2$ between seat back portion 210 and the back of user 202 is about 0.8 to 1.2 inches, about 1.0 inch, or about 1 inch. FIG. 2C illustrates seat 200 in a reclined position in which angle $A_3$ between seat back portion 210 and horizontal axis 216 is about 155 to 165 degrees, or about 160 degrees (i.e., about 70 degrees of recline). In this position, the amount of back shear $S_3$ between seat back portion 210 and the back of user 202 is about 2.4 to 2.8 inches, about 2.6 inches, or about 2½ inches.

Linkage 224 is configured such that, as the linkage is moved from the upright position (FIG. 2A) to the reclined position (FIG. 2C), the amount of shear between the seat back portion 210 and the back of the user 202 seated within the wheelchair is less than the amount of shear between seat back 110 and the back of user 102 seated within a wheelchair having conventional reclining seating system 100 illustrated in FIGS. 1A-1C. For example, in the partially reclined position (i.e., about 35 degrees of recline), user 202 seated within seat 200 experiences about 1 inch of back shear and user 102 seated within conventional seating system 100 experiences about 3 inches of back shear. In the reclined position (i.e., about 70 degrees of recline), user 202 seated within seat 200 experiences about 2½ inches of back shear and user 102 seated within conventional seating system 100 experiences about 6 inches of back shear.

Linkage 224 is configured such that the path of travel of seat back portion 210 relative to bottom portion 208 as the linkage is moved from the upright position (FIG. 2A) to the reclined position (FIG. 2C) approximates the natural pivot of the back of user 202 relative to the user's hip joint 206. Linkage 224 may be adjusted to alter the path of travel of seat back portion 210 relative to bottom portion 208. For example, as described in greater detail below relative to linkage 324, the effective length and pivot axis locations of first link 218 and second link 220 may be selected to provide different paths of travel of seat back portion 210 relative to bottom portion 208 as linkage 224 is moved from the upright position to the reclined position.

Figure 3C:
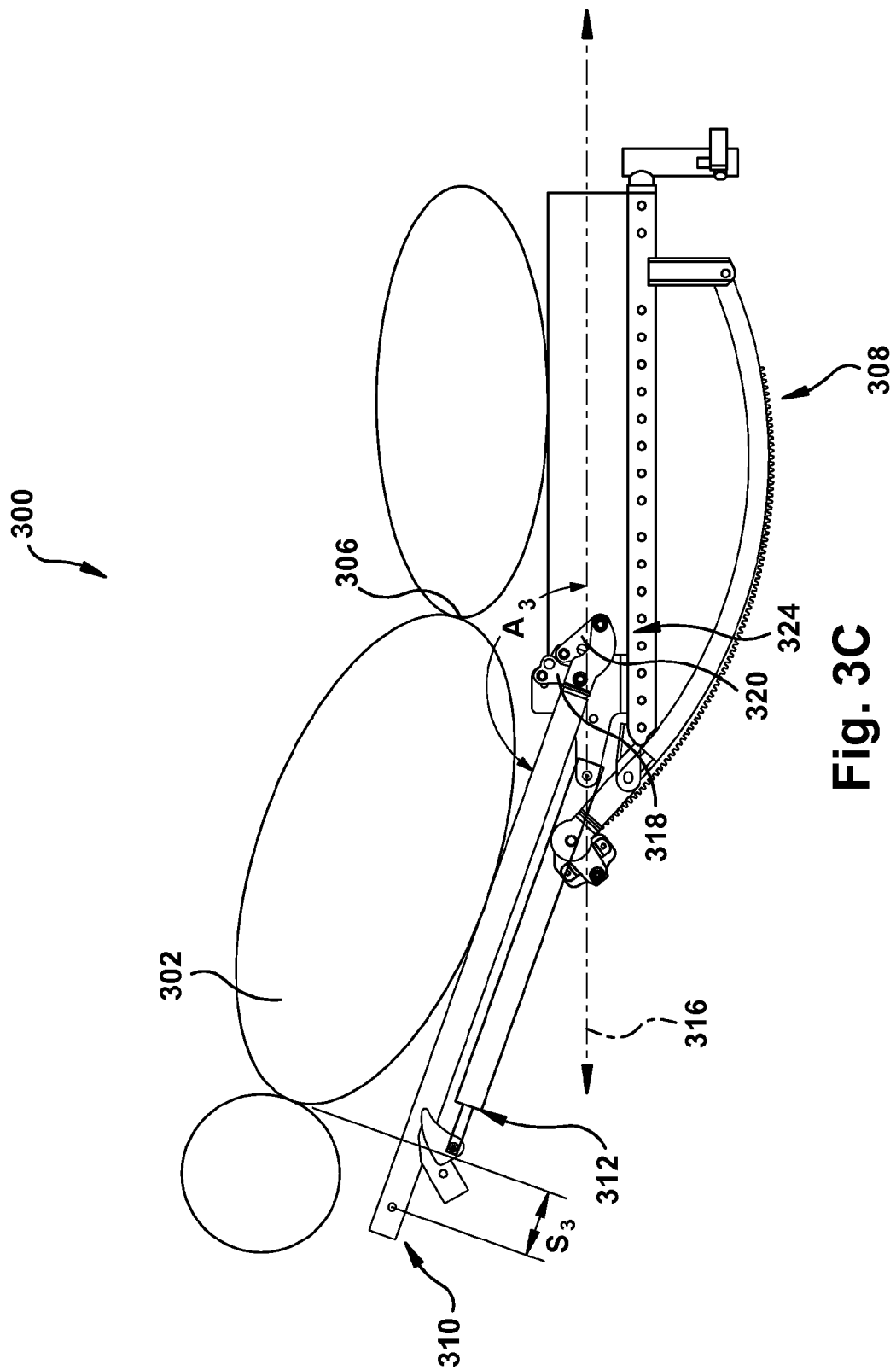
Figure 4:
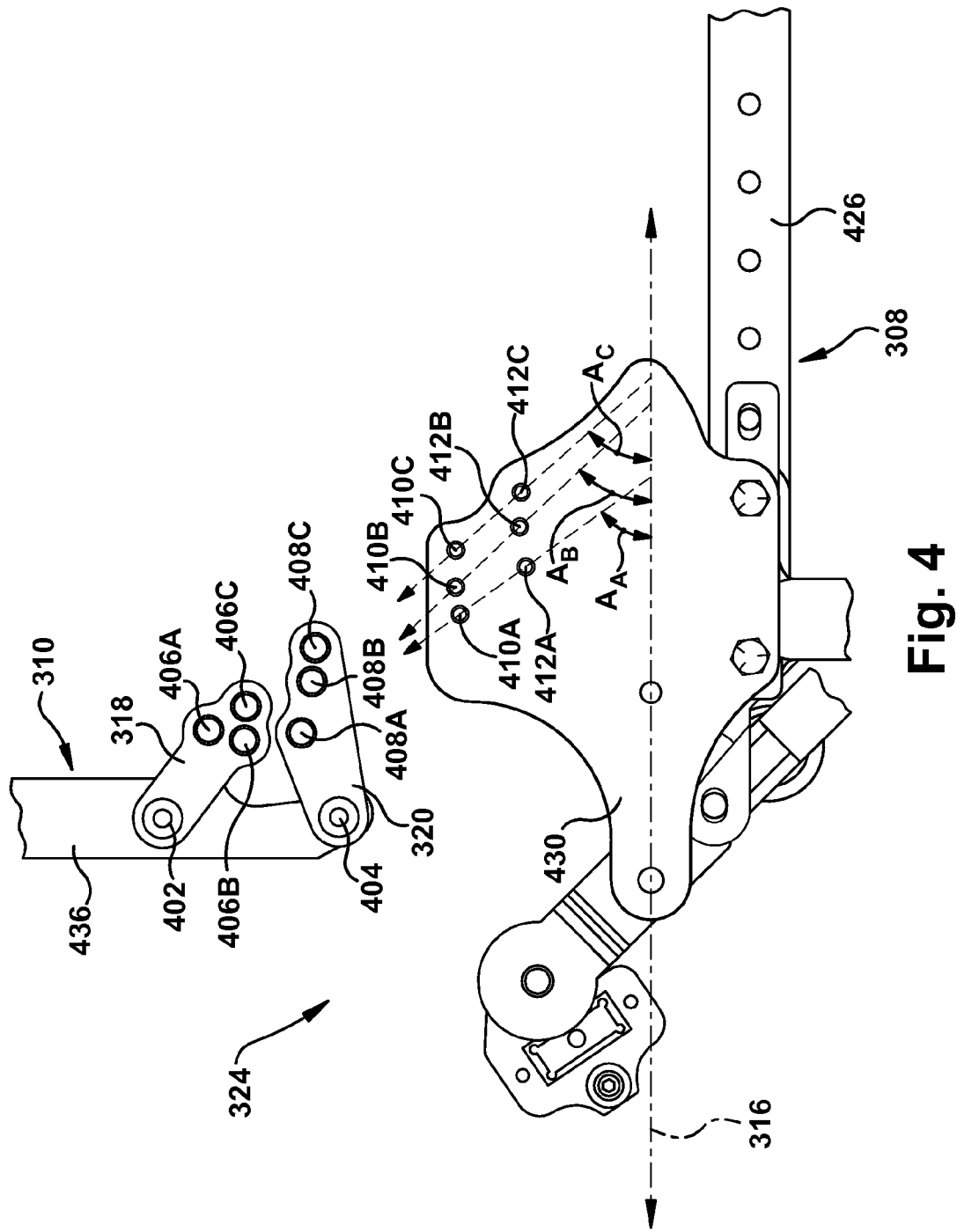
FIG. 4 is a partially exploded side elevational view of one embodiment of a linkage of the present invention.

FIGS. 3A-4 illustrate a seat 300 for a wheelchair according to one embodiment of the present application. Seat 300 includes a seat back portion 310, a bottom portion 308, and a linkage 324 coupling the seat back portion to the bottom portion such that the seat back portion is movable relative to the bottom portion. Seat 300 further includes a locking mechanism 312 coupled to seat back portion 310 and a bracket member 430 of bottom portion 308 to control the movement of the seat back portion relative to the bottom portion. As shown, locking mechanism 312 is a locking cylinder configured to selectively lock linkage 324 in an upright position, a reclined position, and a plurality of positions in between.

As illustrated in FIGS. 3A-4, linkage 324 is a four bar linkage that includes seat back portion 310, bottom portion 308, first link 318, and second link 320. First link 318 and second link 320 are pivotally connected to a lower end portion 436 of seat back portion 310. First link 318 and second link 320 are also pivotally connected to a bracket member 430 of bottom portion 308. As shown, bracket member 430 is adjustably attached to a horizontal seat member 426 of bottom portion 308 such that the bracket member may be selectively positioned along a length of the horizontal seat member.

As illustrated in FIGS. 3A-3C, linkage 324 is configured such that the movement of the linkage from an upright position (FIG. 3A) to a reclined position (FIG. 3C) causes the lower end portion 436 of seat back portion 310 to move downward and forward relative to bottom portion 308. First link 318 and second link 320 both rotate in a counterclockwise direction relative to lower end portion 436 of seat back portion 310 and bracket member 430 of bottom portion 308 as linkage 324 moves from the upright position to the reclined position. Further, linkage 324 is configured such that the path of travel of seat back portion 310 relative to bottom portion 308 as the linkage is moved from the upright position to the reclined position approximates the natural pivot of the back of user 302 relative to the user's hip joint 306.

FIG. 3A illustrates seat 300 in a substantially upright position in which an angle $A_1$ between seat back portion 310 and a horizontal axis 316 is about 90 degrees (i.e., the seat back portion is substantially perpendicular to the horizontal axis or about 0 degrees of recline). FIG. 3B illustrates seat 300 in a partially reclined position in which an angle $A_2$ between seat back portion 310 and horizontal axis 316 is about 120 to 130 degrees, or about 125 degrees (i.e., about 35 degrees of recline). In this position, the amount of back shear $S_2$ between seat back portion 310 and the back of user 302 is about 0.5 to 1.5 inches, 0.8 to 1.2 inches, about 1.0 inch, about 1 inch, or less than about 1.2 inches. FIG. 3C illustrates seat 300 in a reclined position in which angle $A_3$ between seat back portion 310 and horizontal axis 316 is about 155 to 165 degrees, or about 160 degrees (i.e., about 70 degrees of recline). In this position, the amount of back shear $S_3$ between seat back portion 310 and the back of user 302 is about 2.0 to 3.0 inches, 2.4 to 2.8 inches, about 2.6 inches, about 2½ inches, or less than about 2.7 inches.

FIG. 4 illustrates the adjustability of linkage 324 to selectively provide different paths of travel of seat back portion 310 relative to bottom portion 308 as the linkage is moved from the upright position (FIG. 3A) to the reclined position (FIG. 3C). As shown, the effective length and pivot axis locations of first link 318 and second link 320 are selected such that movement of linkage 324 from the upright position to the reclined position causes lower end portion 436 of seat back portion 310 to move downward and forward relative to bottom portion 308. The effective length of the link is the distance between the pivot axis locations of the link.

As illustrated in FIG. 4, first link 318 is pivotally attached to lower end portion 436 of seat back portion 310 at a first location 402. The effective length of first link 318 may be adjusted and fixed through the use of one or more apertures 406A-C in the first link, which are aligned with one or more apertures 410A-C in bracket member 430 of bottom portion 308. A fastener is then used through the appropriately aligned apertures to pivotally attach first link 318 to bracket member 430 of bottom portion 308 at a second location. As such, the first and second locations represent the pivot axes of first link 318 and the distance in between these axes is the effective length of the first link.

As illustrated in FIG. 4, second link 320 is pivotally attached to lower end portion 436 of seat back portion 310 at a first location 404. The effective length of second link 320 may be adjusted and fixed through the use of one or more apertures 408A-C in the second link, which are aligned with one or more apertures 412A-C in bracket member 430 of bottom portion 308. A fastener is then used through the appropriately aligned apertures to pivotally attach second link 320 to bracket member 430 of bottom portion 308 at a second location. As such, the first and second locations represent the pivot axes of second link 320 and the distance in between these axes is the effective length of the second link.

As illustrated in FIG. 4, linkage 324 is a four bar linkage that includes seat back portion 310, bottom portion 308, first link 318, and second link 320. In this regard, the distance between the pivotal connection between first link 318 and lower end portion 436 of seat back portion 310 (i.e., first location 402 of the first link) and the pivotal connection between second link 320 and the lower end portion (i.e., first location 404 of the second link) is the effective length of a coupler link coupling the first link to the second link.

Further, the distance between the pivotal connection between first link 318 and bracket member 430 of bottom portion 308 (i.e., the second location of the first link) and the pivotal connection between second link 320 and the bracket member (i.e., the second location of the second link) is the effective length of a ground link of the four bar linkage. For example, as illustrated in FIG. 4, the effective length of the ground link may be the distance between apertures 410A and 412A, 410B and 412B, or 410C and 412C of bracket member 430. Also, the orientation of the ground link may be the angle between a line intersecting apertures 410A and 412A, 410B and 412B, or 410C and 412C and a horizontal axis 316. These angles are illustrated in FIG. 4 as angles $A_A$, $A_B$, and $A_C$, respectively.

Numerous configurations of linkage 324 are possible. For example, seat back portion 310, bottom portion 308, first link 318, and second link 320 may include more or less apertures in various locations that selectively provide different effective lengths and pivot axis locations of the first, second, coupler, and/or ground links. The various configurations of linkage 324 provide different paths of travel of seat back portion 310 relative to bottom portion 308 as the linkage is moved from the upright position to the reclined position. These different paths of travel may also result in various amounts of back shear reduction when compared to conventional reclining seating system 100 illustrated in FIGS. 1A-1C.

For example, three exemplary configurations of linkage 324 illustrated in FIG. 4 include configurations A, B, and C. In configuration A, first link 318 and second link 320 are pivotally connected to bracket member 430 of bottom portion 308 with fasteners inserted through aligned apertures 406A/410A and 408A/412A, respectively. In configurations B, first link 318 and second link 320 are pivotally connected to bracket member 430 with fasteners inserted through aligned apertures 406B/410B and 408B/412B, respectively. In configuration C, first link 318 and second link 320 are pivotally connected to bracket member 430 with fasteners inserted through aligned apertures 406C/410C and 408C/412C, respectively. Exemplary configurations A, B, and C of linkage 324 result in about 2 to 4 inches or more in back shear reduction in the reclined position when compared to conventional reclining seating system 100 in the reclined position.

For each exemplary configuration A, B, and C of linkage 324, Table 1 below illustrates the approximate effective lengths (inches) of the first, second, coupler, and ground links and the orientation (degrees) of the ground link. Table 1 also illustrates an approximate amount of back shear reduction associated with exemplary configurations A, B, and C of linkage 324 when compared to conventional reclining seating system 100 illustrated in FIGS. 1A-1C. The amount of back shear reduction is compared with linkage 324 in the reclined position (FIG. 3C, about 70 degrees of recline) and seating system 100 in the reclined position (FIG. 1C, about 70 degrees of recline).

|   | Back Shear Reduction (in) | First Link Effective Length (in) | Second Link Effective Length (in) | Coupler Link Effective Length (in) | Ground Link Effective Length (in) | Ground Link Orientation (degrees) |
|---|---|---|---|---|---|---|
| A | 2 | 1.26 | 1.16 | 2.19 | 1.03 | 57.6 |
| B | 3 | 1.40 | 1.74 | 2.19 | 1.13 | 45.1 |
| C | 3.8 | 1.75 | 2.14 | 2.19 | 1.11 | 48.1 |

As stated, many other configurations of linkage 324 are possible. For example, the effective length, pivot axis locations, and orientation of any one or more of the first link, second link, coupler link, and ground link may be adjusted through the use of multiple apertures and/or slots formed in the links. Any suitable fastener that permits the links to pivot may be used to connect the links, such as a pin or clamp type fastener. A suitable fastener may be of an easily removable type not requiring the use of tools. One or more of the links may also include an adjustment mechanism that alters the actual length of the link. For example, the link may include telescoping portions that selectively lock relative to one another to fix the actual length of the link.

Figure 5:
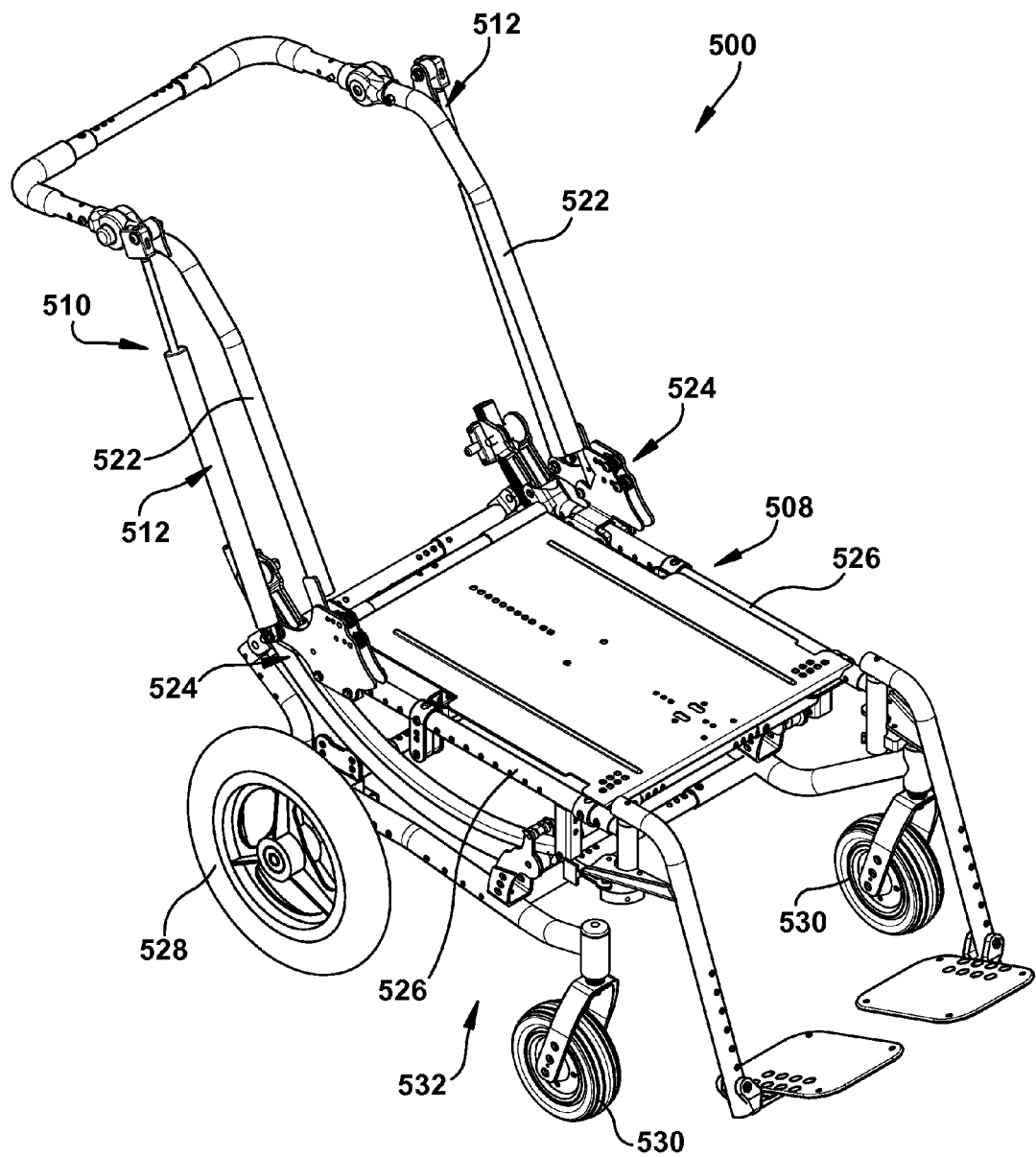
FIG. 5 is a perspective view of one embodiment of a wheelchair of the present invention.
Figure 6:
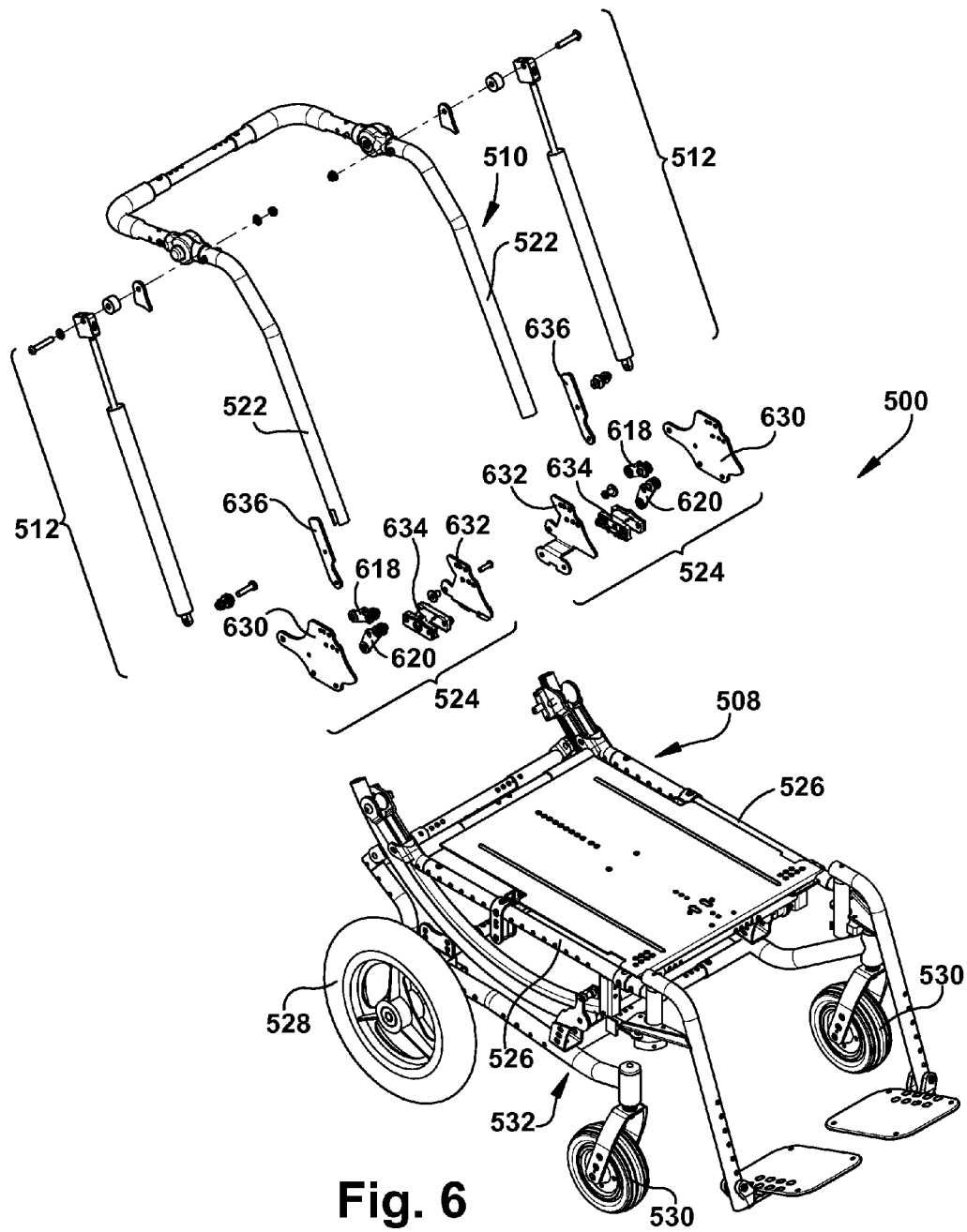
FIG. 6 is an exploded perspective view of one embodiment of a wheelchair of the present invention.

FIGS. 5 and 6 illustrate a wheelchair 500 according to one embodiment of the present application. Wheelchair 500 includes a pair of drive wheels 528 and caster wheels 530 supporting a wheelchair frame 532. Wheelchair 500 further includes a seat assembly comprising a seat back portion 510, a seat bottom portion 508, and two pivoting assemblies 524 coupling the seat back portion to the seat bottom portion such that the seat back portion is movable relative to the seat bottom portion. As illustrated in FIG. 5, wheelchair 500 is in a partially reclined position (e.g., about 35 degrees of recline relative to an upright position). The seat assembly of wheelchair 500 is tiltable relative to wheelchair frame 532 such that seat bottom portion 508 and seat back portion 510 may be angled relative to the surface supporting the wheelchair. However, the seat assembly may be utilized on any conventional or typical wheelchair such as a powered wheelchair or manual wheelchair. Further, in some embodiments, a seat back cushion is fixed relative to seat back portion 510 as the seat back portion is moved relative to seat bottom portion 508.

Figure 7:
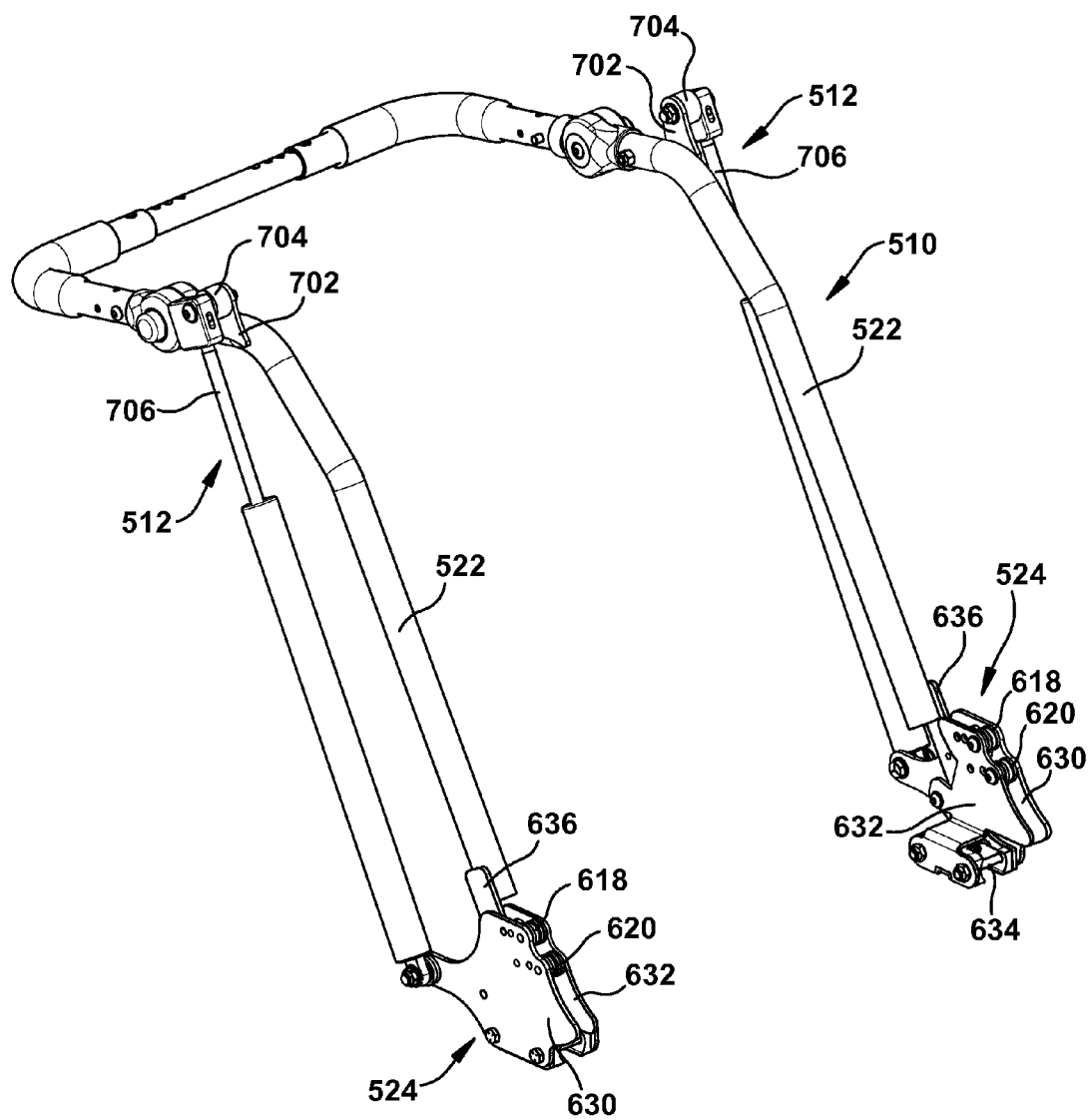
FIG. 7 is a perspective view of one embodiment of a seat back and pivoting assembly of the present invention.

As illustrated in FIGS. 5-7, seat back portion 510 includes a left and right seat back member 522. Each seat back member 522 includes a flange 636 attached at a lower end of the seat back member. Further, seat bottom portion 508 includes a left and right seat bottom member 526, each seat bottom member having a plurality of apertures along its length for selective attachment of pivoting assemblies 524. As shown in FIGS. 6 and 7, each pivoting assembly 524 includes a bracket 634 that may be adjustably attached to seat bottom member 526 to permit selective positioning of the bracket along the length of the seat bottom member. The position of bracket 634 may be adjusted and fixed through the use of one or more apertures in the bracket, which are aligned with one or more apertures in seat bottom member 526. A fastener is then used through the appropriately aligned apertures to fix bracket 634 relative to seat bottom member 526.

Figure 8:
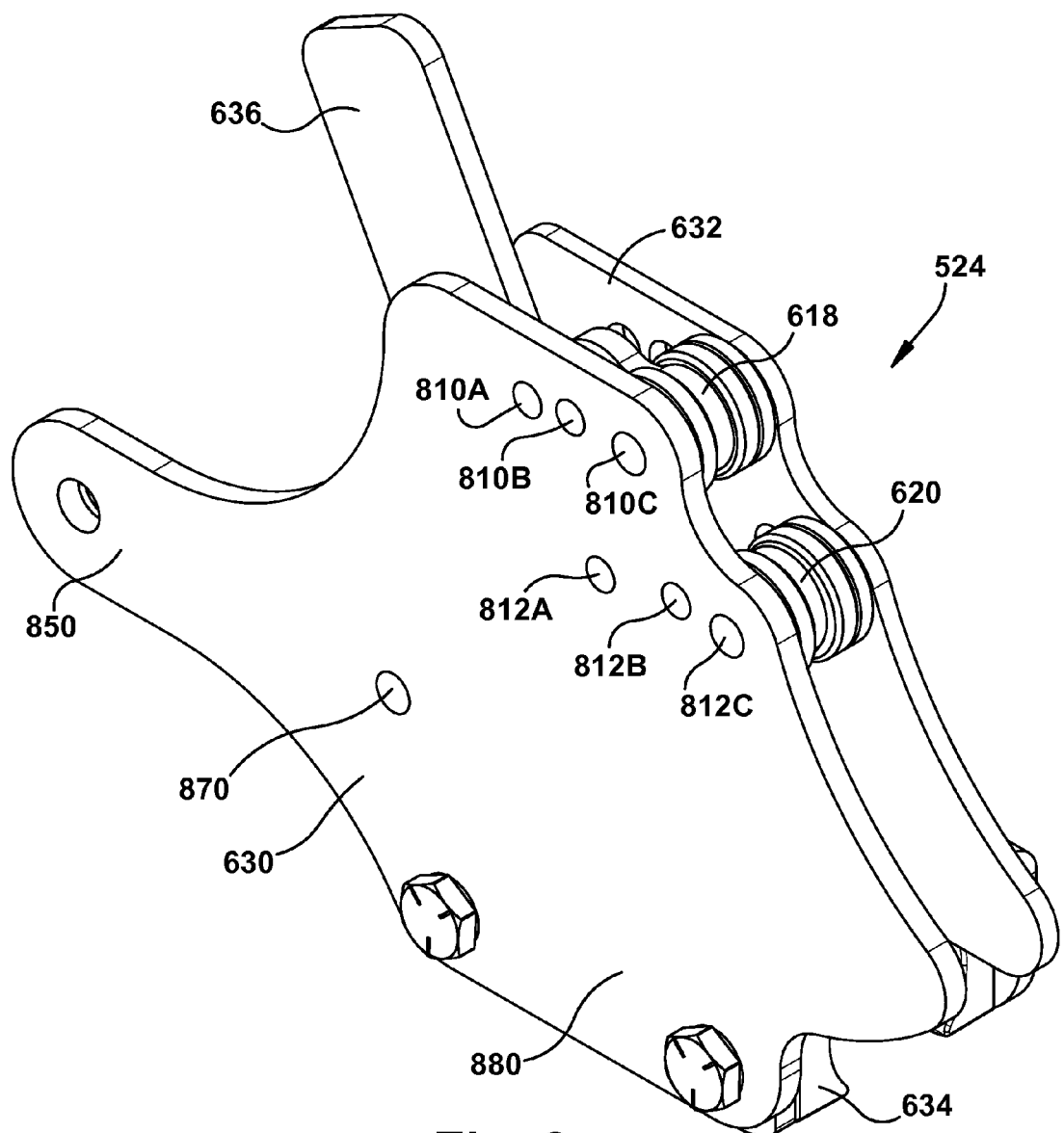
FIG. 8 is a perspective view of one embodiment of a pivoting assembly of the present invention.
Figure 9:
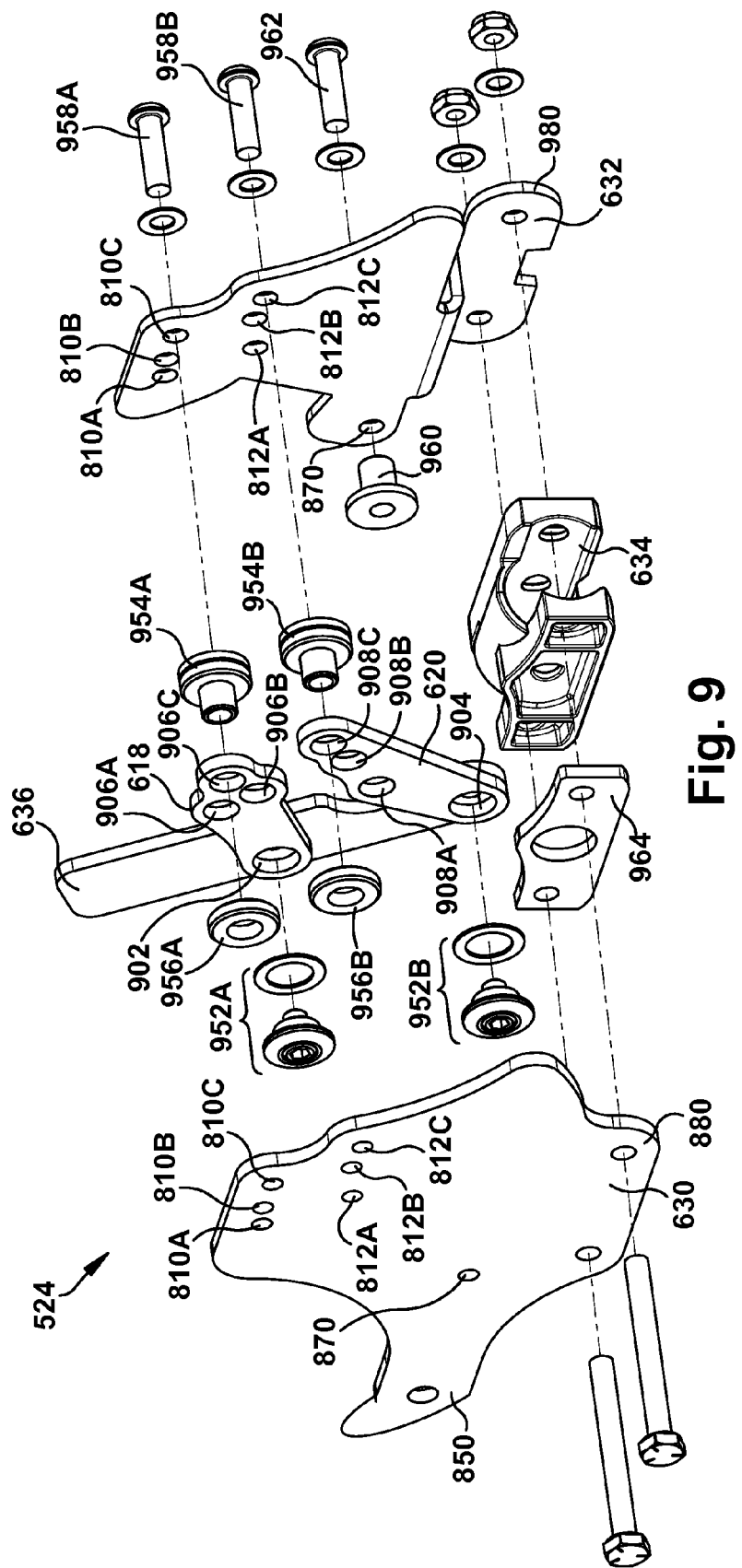
FIG. 9 is an exploded perspective view of one embodiment of a pivoting assembly of the present invention.
Figure 10A:
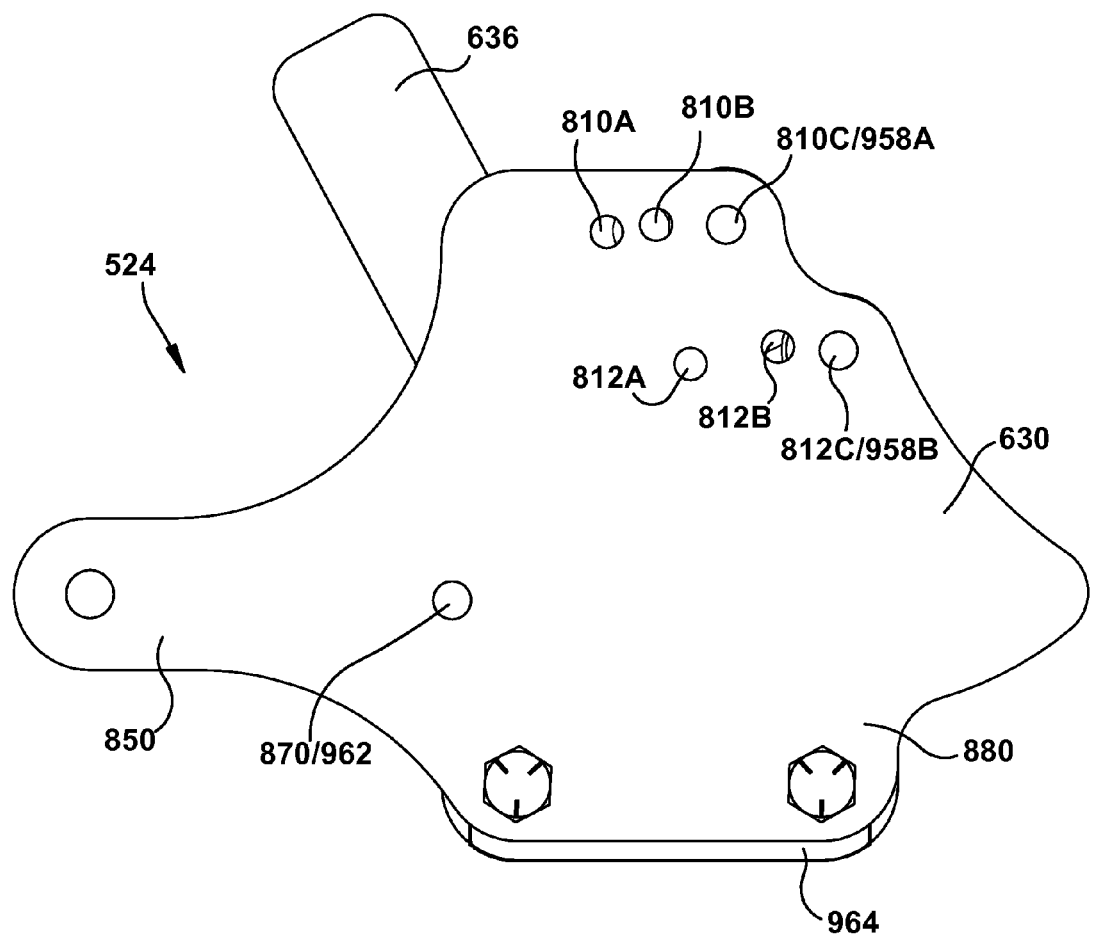
FIGS. 10A-10C are right side elevational, left side elevational, and front elevational views of one embodiment of a pivoting assembly of the present invention.
Figure 10B:
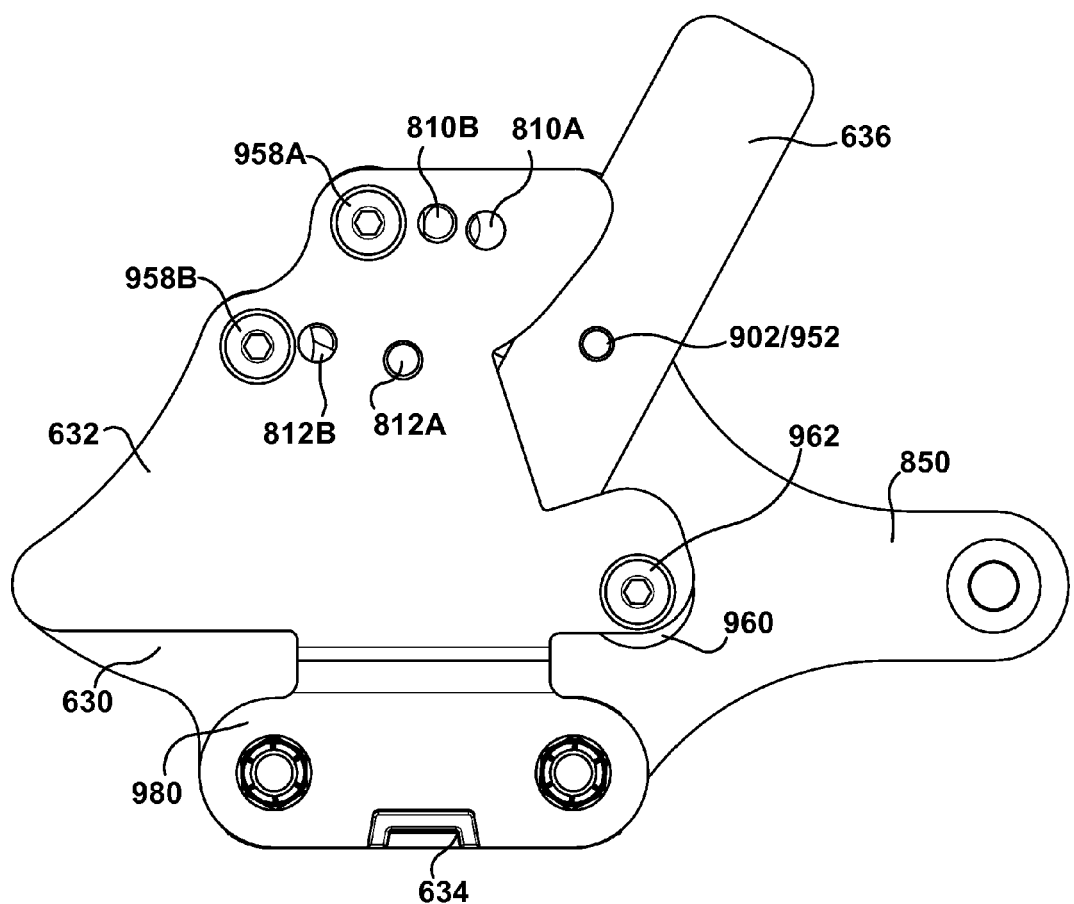
Figure 10C:
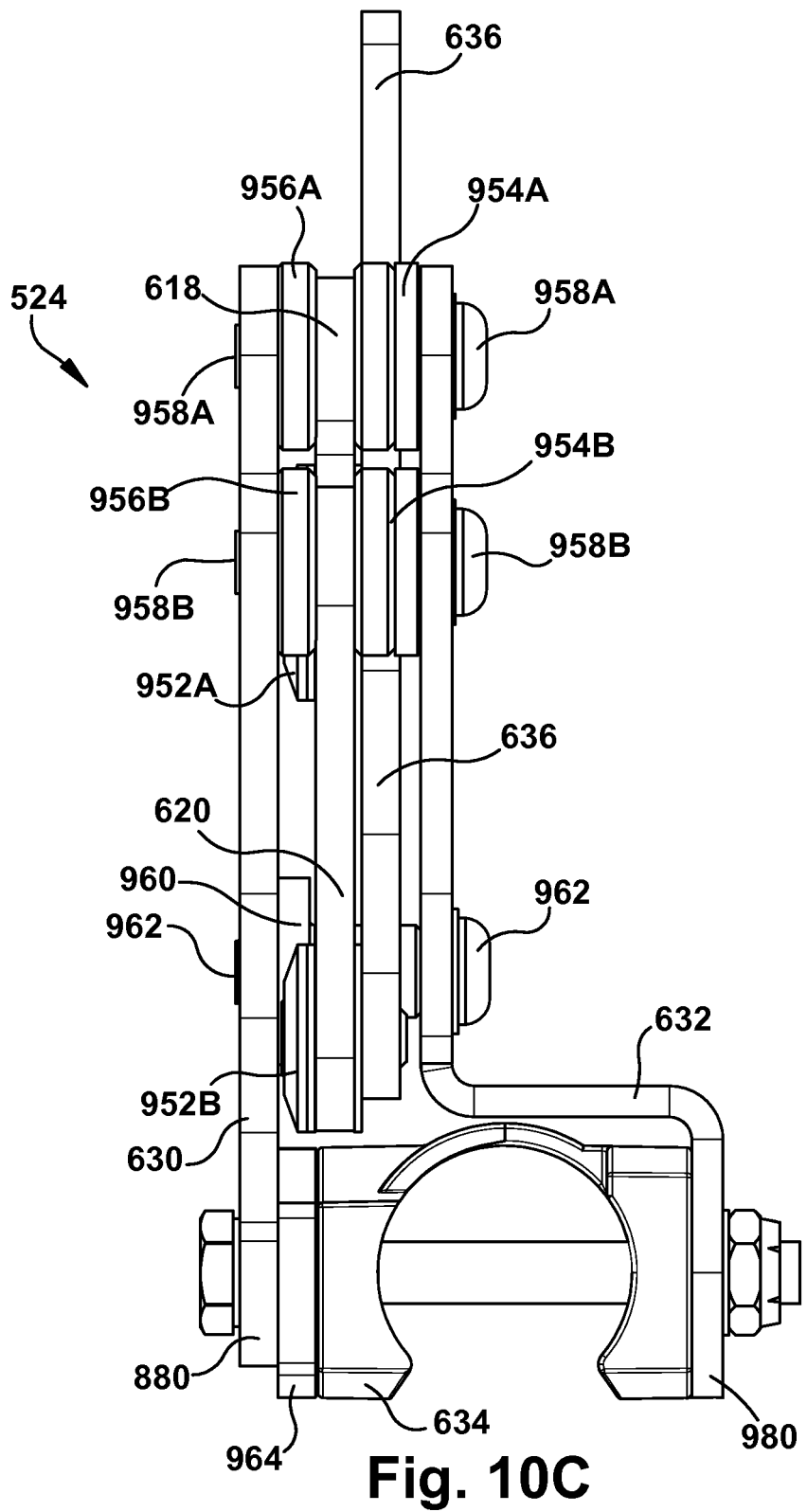

Wheelchair 500 further includes two locking mechanisms 512 coupled to seat back portion 510 and seat bottom portion 508 to control the movement of the seat back portion relative to the seat bottom portion. As illustrated in FIG. 7, locking mechanisms 512 are locking gas cylinders configured to selectively lock pivoting assembly 524 in an upright position, a reclined position, and a plurality of positions in between. A connecting rod 706 of each locking mechanism 512 is pivotally connected to a flange 702 attached to an upper end of each seat back member 522. A bushing 704 is positioned between connecting rod 706 and flange 702 to permit pivotal movement of the connecting rod relative to seat back member 522. Further, a cylinder portion of each locking mechanism 512 is pivotally connected to a locking mechanism attachment portion 850 (FIG. 8) of an outer plate 630 of each pivoting assembly 524.

As illustrated in FIGS. 8, 9, and 10A-10C, each pivoting assembly 524 includes outer plate 630, a first link 618, a second link 620, bracket 634, and an inner plate 632. Each pivoting assembly 524 is configured to form a four bar linkage that includes seat back portion 510, seat bottom portion 508, first link 618, and second link 620. First link 618 and second link 620 are pivotally connected to flange 636 of seat back portion 510. First link 618 and second link 620 are also pivotally connected to outer plate 630 and inner plate 632. A bracket attachment portion 880 of outer plate 630 and a bracket attachment portion 980 of inner plate 632 are attached to bracket 634, which is attached to seat bottom member 526 of seat bottom portion 508 (see FIG. 5).

Each pivoting assembly 524 is configured such that the movement of the four bar linkage from an upright position to a reclined position causes a lower end portion of seat back portion 510 to move downward and forward relative to seat bottom portion 508. First link 618 and second link 620 both rotate in the same direction relative to flange 636 of seat back portion 510 and outer and inner plates 630 and 632 (attached via bracket 634 to seat bottom portion 508) as the four bar linkage moves from the upright position to the reclined position. Further, each pivoting assembly 524 is configured such that the path of travel of seat back portion 510 relative to seat bottom portion 508 as the four bar linkage is moved from the upright position to the reclined position approximates the natural pivot of the back of a user of wheelchair 500 relative to the user's hip joint.

Each pivoting assembly 524 is also adjustable to selectively provide different paths of travel of seat back portion 510 relative to seat bottom portion 508 as the four bar linkage is moved from the upright position to the reclined position. The effective length and pivot axis locations of first link 618 and second link 620 of each pivoting assembly 524 are selected such that movement of the four bar linkage from the upright position to the reclined position causes the lower end portion of seat back portion 510 to move downward and forward relative to seat bottom portion 508.

As illustrated in FIGS. 8, 9, and 10A-10C, first link 618 of pivoting assembly 524 is pivotally attached to flange 636 of seat back portion 510 at a first location with a fastener 952A inserted through apertures 902. The effective length of first link 618 may be adjusted and fixed through the use of one or more apertures 906A-C in the first link, which are aligned with one or more apertures 810A-C in outer plate 630 and inner plate 632. A fastener 958A is then used through the appropriately aligned apertures to pivotally attach first link 618 to outer plate 630 and inner plate 632 at a second location. Bushings 954A and 956A may be positioned between first link 618 and outer and inner plates 630 and 632 to permit pivotal movement of the first link relative to the plates. The first and second locations represent the pivot axes of first link 618 and the distance in between these axes is the effective length of the first link.

As illustrated in FIGS. 8, 9, and 10A-10C, second link 620 of pivoting assembly 524 is pivotally attached to flange 636 of seat back portion 510 at a first location with a fastener 952B inserted through apertures 904. The effective length of second link 620 may be adjusted and fixed through the use of one or more apertures 908A-C in the second link, which are aligned with one or more apertures 812A-C in outer plate 630 and inner plate 632. A fastener 958B is then used through the appropriately aligned apertures to pivotally attach second link 620 to outer plate 630 and inner plate 632 at a second location. Bushings 954B and 956B may be positioned between second link 620 and outer and inner plates 630 and 632 to permit pivotal movement of the second link relative to the plates. The first and second locations represent the pivot axes of second link 620 and the distance in between these axes is the effective length of the second link.

As stated, each pivoting assembly 524 is configured to form a four bar linkage that includes seat back portion 510, seat bottom portion 508, first link 618, and second link 620. In this regard, first link 618 and second link 620 of each pivoting assembly 524 are pivotally connected to flange 636 of seat back portion 510. The distance between the pivotal connection between first link 618 and flange 636 of seat back portion 510 (i.e., the first location of the first link) and the pivotal connection between second link 620 and the flange (i.e., the first location of the second link) is the effective length of a coupler link coupling the first link to the second link.

First link 618 and second link 620 of each pivoting assembly 524 are also pivotally connected to seat bottom member 526 of seat bottom portion 508 via outer and inner plates 630 and 632 and bracket 634. The distance between the pivotal connection between first link 618 and outer and inner plates 630 and 632 (i.e., the second location of the first link) and the pivotal connection between second link 620 and the plates (i.e., the second location of the second link) is the effective length of a ground link of the four bar linkage. For example, as illustrated in FIGS. 8-10B, the effective length of the ground link may be the distance between apertures 810A and 812A, 810B and 812B, or 810C and 812C of outer and inner plates 630 and 632. Also, the orientation of the ground link may be the angle between a line intersecting apertures 810A and 812A, 810B and 812B, or 810C and 812C and a horizontal axis.

Numerous configurations of pivoting assembly 524 are possible. For example, seat back portion 510, seat bottom portion 508, first link 618, and second link 620 may include more or less apertures in various locations that selectively provide different effective lengths and pivot axis locations of the first, second, coupler, and/or ground links. The various configurations of pivoting assembly 524 provide different paths of travel of seat back portion 510 relative to seat bottom portion 508 as the four bar linkage is moved from the upright position to the reclined position. These different paths of travel may also result in various amounts of back shear reduction when compared to conventional reclining seating system 100 illustrated in FIGS. 1A-1C.

As illustrated in FIGS. 9 and 10A-10C, each pivoting assembly 524 may also include an optional spacer 960 to provide rigidity to the plates of the pivoting assembly. Spacer 960 may also act as a stop to prohibit movement of the four bar linkage beyond a fully reclined position. As illustrated, spacer 960 may be fixed relative to outer plate 630 and inner plate 632 through the use of fastener 962 inserted through apertures 870 in the plates. As flange 636 moves from an upright position to a reclined position, the flange may contact spacer 960 to prohibit movement of the flange beyond a fully reclined position.

Further, each pivoting assembly 524 may include an optional plate 964 positioned between outer plate 630 and bracket 634 that permits the pivoting assembly to be coupled to various configurations of the wheelchair. For example, in other embodiments, an arm socket for attachment of an arm of the wheelchair is positioned between outer plate 630 and bracket 634 instead of plate 964. Thus, the use of plate 964 permits pivoting assembly 524 to be interchangeable between various configurations of the wheelchair.

An exemplary method of reclining a seat back portion relative to a seat bottom portion of a wheelchair is described below. The exemplary method includes positioning the seat back portion in an upright position relative to the seat bottom portion. The seat back portion is moved from the upright position relative to the seat bottom portion to a reclined position in which the seat back portion is angled relative to the seat bottom portion. The movement of the seat back portion from the upright position to the reclined position causes a lower end portion of the seat back portion to move downward and forward relative to the seat bottom portion.

The seat back portion and the seat bottom portion of the exemplary method may be coupled by a linkage of the present application. For example, the linkage may be a four bar linkage that comprises the seat back portion, the seat bottom portion, a first link, and a second link. The first link and the second link pivot relative to the seat back portion and the seat bottom portion as the seat back portion is reclined. The first link and the second link may also pivot in the same direction relative to the seat back portion and the seat bottom portion as the seat back portion is reclined. The linkage may also be adjustable to selectively provide different paths of travel of the seat back portion relative to the seat bottom portion as the seat back portion is moved from the upright position to the reclined position.

The wheelchair of the exemplary method may also include a pair of the four bar linkages coupling the seat back portion to the seat bottom portion. Further, the wheelchair may include a locking mechanism that may be manipulated to selectively lock the seat back portion in the upright position, the reclined position, and a plurality of positions in between. The wheelchair may also be tiltable such that the seat back portion and the seat bottom portion may be tilted together relative to a horizontal axis.

Figure 11A:
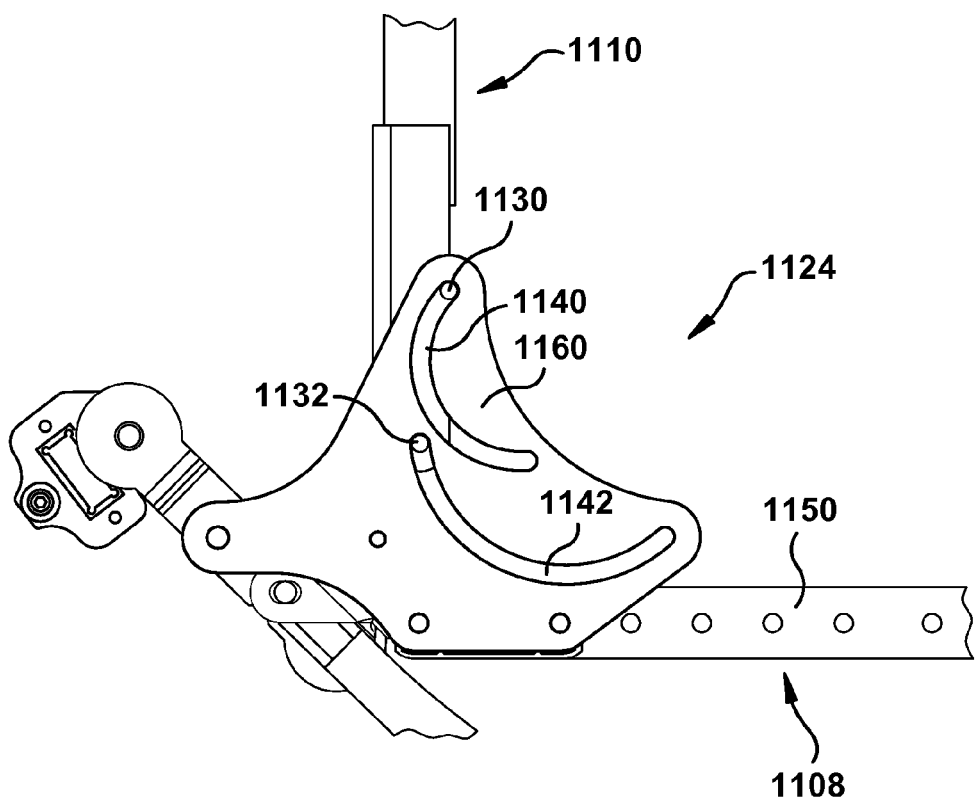
FIGS. 11A and 11B are right side elevational views of one embodiment of a pivoting assembly of the present invention.
Figure 11B:
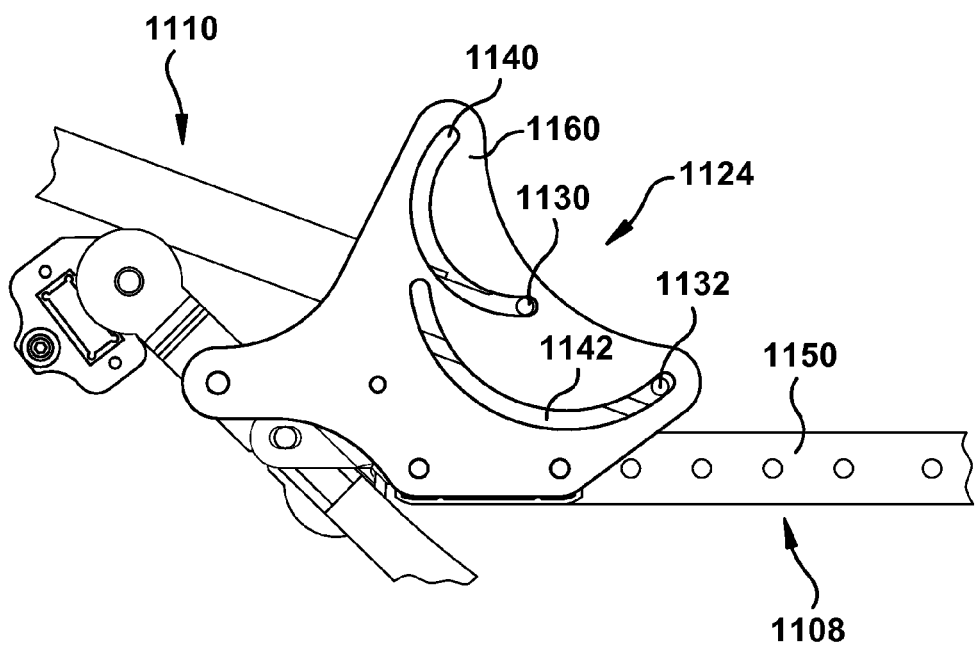

FIGS. 11A and 11B illustrate a pivoting assembly 1124 for a seat of a wheelchair according to one embodiment of the present invention. The seat includes a seat back portion 1110, a bottom portion 1108, and pivoting assembly 1124 coupling the seat back portion to the bottom portion such that the seat back portion is movable relative to the bottom portion. Pivoting assembly 1124 is configured such that, as seat back portion 1110 is moved from an upright position (FIG. 11A) to a reclined position (FIG. 11B), a lower end portion of the seat back portion is moved downward and forward relative to bottom portion 1108.

As shown, pivoting assembly 1124 includes a first pin 1130 and a second pin 1132 attached to the lower end portion of seat back portion 1110. Pivoting assembly 1124 further includes a first slot 1140 and a second slot 1142 formed in plate 1160, which is adjustably attached to seat bottom member 1150 of seat bottom portion 1108. As shown, first slot 1140 and second slot 1142 are arcuate in shape and extend downward and forward relative to bottom portion 1108. First slot 1140 and second slot 1142 are configured to receive first pin 1130 and second pin 1132, respectively. As seat back portion 1110 is moved from the upright position (FIG. 11A) to the reclined position (FIG. 11B), slots 1140 and 1142 guide pins 1130 and 1132 such that the lower end portion of the seat back portion moves downward and forward relative to bottom portion 1108. Pins 1130 and 1132 may be various types of components capable of moving within a guide, such as a roller or bearing. Further, slots 1140 and 1142 may be various types of guides capable of directing the movement of the seat back portion, such as a groove or channel formed within the plate and/or attached to the plate.

FIG. 11A illustrates seat back portion 1110 in a substantially upright position relative to seat bottom portion 1108 (i.e., the seat back portion is substantially perpendicular to a horizontal axis or about 0 degrees of recline). FIG. 11B illustrates seat back portion 1110 in a reclined position relative to seat bottom portion 1108 (i.e., about 70 degrees of recline). Pivoting assembly 1124 is configured such that, as seat back portion 1110 is moved from the upright position to the reclined position, the amount of shear between the seat back portion and the back of a user seated within the wheelchair is less than the amount of shear between seat back 110 and the back of user 102 seated within a wheelchair having conventional reclining seating system 100 illustrated in FIGS. 1A-1C.

Pivoting assembly 1124 is configured such that the path of travel of seat back portion 1110 relative to bottom portion 1108 as the seat back portion is moved from the upright position to the reclined position approximates the natural pivot of the back of a user relative to the user's hip joint. Pivoting assembly 1124 may also be adjusted to alter the path of travel of seat back portion 1110 relative to bottom portion 1108. For example, the location of pins 1130 and 1132 and/or the shape of slots 1140 and 1142 may be selected to provide different paths of travel of seat back portion 1110 relative to bottom portion 1108 as the seat back portion is moved from the upright position to the reclined position.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended aims. Descriptions of exemplary methods or processes are not limited to inclusion of all steps as being required in all cases, nor is the order that the steps are presented to be construed as required or necessary unless expressly so stated.

I claim:
1. A wheelchair, comprising:
a wheelchair frame;
a plurality of wheels supporting the wheelchair frame; and
a seat assembly supported by the wheelchair frame, wherein the seat assembly includes:
a seat back portion;
a bottom portion; and
a pair of linkages coupling the seat back portion to the bottom portion such that movement of the linkages from an upright position to a reclined position causes a lower end portion of the seat back portion to move downward and forward relative to the bottom portion, wherein each linkage comprises a first link and a second link pivotally connecting the seat back portion and the bottom portion.

2. The wheelchair of claim 1 further comprising a locking mechanism configured to selectively lock the linkages in an upright position, a reclined position, and a plurality of positions in between.

3. The wheelchair of claim 1, wherein the first link and the second link pivot relative to the seat back portion and the bottom portion as the seat back portion is moved relative to the bottom portion, and-wherein an effective length and pivot axis locations of the first and second links are selected such that movement of the linkages from the upright position to the reclined position causes the lower end of the seat back portion to move downward and forward relative to the bottom portion.

4. The wheelchair of claim 1, wherein the first link is pivotally connected to the seat back portion at a first pivot point and the bottom portion at a second pivot point, wherein the second link is pivotally connected to the seat back portion at a third pivot point and the bottom portion at a fourth pivot point, and wherein the distance between the first and second pivot points and the distance between the third and fourth pivot points is maintained throughout movement of the linkages from the upright position to the reclined position.

5. The wheelchair of claim 1, wherein the first and second links are rigid links.

6. The wheelchair of claim 1 further comprising a seat back cushion fixed relative to the seat back portion.

7. The wheelchair of claim 1, wherein the linkage is adjustable to alter the path of travel of the seat back portion relative to the bottom portion as the linkage is moved from the upright position to the reclined position.

8. The wheelchair of claim 1, wherein the first link and the second link are pivotally attached to the lower end of the seat back portion.

9. The wheelchair of claim 1, wherein the linkage is configured such that the amount of back shear as the linkage is moved from the upright position to the reclined position is less than the amount of back shear for a wheelchair in which the wheelchair seat back is reclined relative to a wheelchair seat bottom pivotally connected to the wheelchair seat back at a simple pivot point.

10. The wheelchair of claim 1, wherein the seat assembly is configured to tilt relative to the wheelchair frame of the wheelchair such that the bottom portion of the seat assembly is angled relative to a horizontal axis.

11. The wheelchair of claim 1, wherein an effective length and pivot axis locations of the first and second links are selected such that movement of each linkage from an upright position to a reclined position causes the lower end of the seat back portion to move downward and forward relative to the bottom portion.

12. The wheelchair of claim 1, wherein the first link and the second link each pivot relative to the seat back portion and the bottom portion as the seat back portion is moved relative to the bottom portion.

13. The wheelchair of claim 12, wherein the first link and the second link pivot in the same direction relative to the seat back portion and the bottom portion as the seat back portion is moved relative to the bottom portion.

14. The wheelchair of claim 12, wherein the seat back portion, the bottom portion, the first link, and the second link form a four bar linkage.

15. The wheelchair of claim 1, wherein the linkages are adjustable to selectively provide different paths of travel of the seat back portion relative to the bottom portion as the linkages are moved from an upright position to a reclined position.

16. The wheelchair of claim 15, wherein the first link is pivotally attached to the seat back portion at a first location and the bottom portion at a second location, and wherein the second link is pivotally attached to the seat back portion at a first location and the bottom portion at a second location.

17. The wheelchair of claim 16, wherein the distance between the first location of the first link and the first location of the second link is adjustable to selectively provide different paths of travel of the seat back portion relative to the bottom portion as the linkages are moved from an upright position to a reclined position.

18. The wheelchair of claim 16, wherein the distance between the first and second locations of the first link is adjustable to selectively provide different paths of travel of the seat back portion relative to the bottom portion as the linkages are moved from an upright position to a reclined position.

19. The wheelchair of claim 16, wherein the distance between the first and second locations of the second link is adjustable to selectively provide different paths of travel of the seat back portion relative to the bottom portion as the linkages are moved from an upright position to a reclined position.

20. The wheelchair of claim 16, wherein the distance between the second location of the first link and the second location of the second link is adjustable to selectively provide different paths of travel of the seat back portion relative to the bottom portion as the linkages are moved from an upright position to a reclined position.

21. The wheelchair of claim 16, wherein an angle between an axis intersecting the second location of the first link and the second location of the second link and a horizontal axis is adjustable to selectively provide different paths of travel of the seat back portion relative to the bottom portion as the linkages are moved from an upright position to a reclined position.

22. A wheelchair, comprising:
a wheelchair frame;
a plurality of wheels supporting the wheelchair frame; and
a seat assembly supported by the wheelchair frame, wherein the seat assembly includes:
  a seat back portion;
  a bottom portion; and
  a linkage coupling the seat back portion to the bottom portion such that movement of the linkage from an upright position to a reclined position causes a lower end portion of the seat back portion to move downward and forward relative to the bottom portion, wherein the linkage is adjustable to alter the path of travel of the seat back portion relative to the bottom portion as the linkage is moved from the upright position to the reclined position.

23. A wheelchair, comprising:
a wheelchair frame;
a plurality of wheels supporting the wheelchair frame; and
a seat assembly supported by the wheelchair frame, wherein the seat assembly includes:
  a seat back portion;
  a bottom portion; and
  a linkage coupling the seat back portion to the bottom portion such that movement of the linkage from an upright position to a reclined position causes a lower end portion of the seat back portion to move downward and forward relative to the bottom portion, wherein the linkage is adjustable to selectively provide different paths of travel of the seat back portion relative to the bottom portion as the linkage is moved from the upright position to the reclined position.

* * * * *